United States Patent
Park et al.

(10) Patent No.: US 7,356,068 B2
(45) Date of Patent: Apr. 8, 2008

(54) FREQUENCY HOPPING SEQUENCE GENERATOR

(75) Inventors: Sung-Bok Park, Daejeon (KR); Kwang-Euk Lee, Daejeon (KR); Young Kyun Choi, Daejeon (KR)

(73) Assignee: Agency for Defense Development, Daejon (KR)

( * ) Notice: Subject to any disclaimer, the term of this patent is extended or adjusted under 35 U.S.C. 154(b) by 690 days.

(21) Appl. No.: 10/686,095

(22) Filed: Oct. 15, 2003

(65) Prior Publication Data

US 2004/0081226 A1    Apr. 29, 2004

(30) Foreign Application Priority Data

Oct. 15, 2002    (KR) ............... 10-2002-0062976

(51) Int. Cl.
*H04B 1/00* (2006.01)
(52) U.S. Cl. ..................................... 375/132
(58) Field of Classification Search ............... 375/130, 375/131, 132, 135, 133, 136, 267; 370/319, 370/344, 346; 455/464, 450, 451, 452.1; 341/57; 342/13, 14, 15, 16, 17, 18, 30, 42, 342/51

See application file for complete search history.

(56) References Cited

U.S. PATENT DOCUMENTS

| | | | |
|---|---|---|---|
| 6,112,094 A * | 8/2000 | Dent | 455/452.1 |
| 6,351,643 B1 * | 2/2002 | Haartsen | 455/450 |
| 7,116,699 B2 * | 10/2006 | Batra et al. | 375/132 |
| 2003/0147453 A1 * | 8/2003 | Batra | 375/132 |
| 2004/0077349 A1 * | 4/2004 | Barak et al. | 455/436 |

OTHER PUBLICATIONS

Komo et al. Maximal Length Sequence for Frequency Hopping, Jun. 1990, IEEE vol. 8, No. 5, p. 819-822.*
S. M. Sussman, et al., "Partial Processing Satellite Relays for Frequency-Hop Antijam Communications", *IEEE Transactions on Communications*, vol. Com-30, No. 8, pp. 1929-1937; Aug. 1982.

* cited by examiner

*Primary Examiner*—Sam K. Ahn
(74) *Attorney, Agent, or Firm*—Scully, Scott, Murphy & Presser, P.C.

(57) ABSTRACT

A frequency hopping sequence generator using a single binary sequence generator adopted for a multi-group frequency hopping frequency division multiple access (FH-FDMA) communication system, includes one binary sequence generator for generating consecutive binary sequences, and plural non-binary sequence converter for mapping a binary sequence into an independent non-binary sequence in each group by using a group ID.

3 Claims, 3 Drawing Sheets

FREQUENCY HOPPING SEQUENCE GENERATOR

BACKGROUND OF THE INVENTION

1. Field of the Invention

The present invention relates to a frequency hopping sequence generator and, more particularly, to a frequency hopping sequence generator using a single binary sequence generator adopted for a multi-group frequency hopping frequency division multiple access (FH-FDMA) communication system 2. Description of the Background Art The multi-group FH-FDMA is a frequency-hopping spread spectrum (FHSS) communication system exerting an excellent performance in a threatening environment such as jamming, wire-tapping, frequency selection fading, a position detection or the like.

The characteristics of the frequency hopping sequence generator required for the multi-group FH-FDMA communication system are facilitation of a key management, autocorrelation of frequency hopping sequence assigned to each group, and orthogonality (non-collision of chip) between groups or independence.

Let q denote the number of frequency slots in a FHSS system and let $f_i$ denote the center frequency of the i-th slot, $0 \leq i \leq q-1$. The center frequencies are usually chosen that the slots be spaced uniformly across the frequency band allotted to the system. A FH pattern is a sequence $x=(x_0, x_1, \ldots, X_{N-1})$ of N elements from the set $f_0, f_i, \ldots, f_{q-1}$ specifying the order in which the slots are to be used by a particular transmitter. However, it is not necessary that the elements of the set be the center frequencies of the slots. All the various properties of hopping patterns can be described provided only that the set contains q distinct elements. In short, one can also regard a hopping pattern as a sequence of elements, and the pattern can always be transformed into a sequences of frequencies by a suitable one to one mapping from this set to $f_0, f_i, \ldots, f_{q-1}$. This is the viewpoint that will be taken in the rest of this document. In particular, hopping patterns will be viewed as sequences of elements from the finite field $q=2^k$.

In general, the frequency hopping sequence generator used in the FHSS system uses a non-binary sequence converter that maps binary outputs of a binary m-sequence generator into non-binary sequences, i.e. sequences of elements aforementioned.

FIG. 1 is a schematic block diagram of a frequency hopping sequence generator consisting of a binary sequence generator 100 and a non-binary sequence converter 200 in accordance with a conventional art.

With reference to FIG. 1, the frequency hopping sequence is generated by the non-binary sequence converter 200 which, as mentioned above, maps the consecutive binary outputs of the general binary sequence generator 100 into the non-binary sequences.

Since a periodic binary m-sequence of span-n characteristics generates different $2^n$ tuples for one period when observing consecutive n tuples, when read out k (k<n) tuples of the binary sequence continuously, the occurrence frequency of each of $2^k$ tuples becomes $2^{n-k}$. In this manner, consecutive k tuples of the binary sequence generator 100 can be simply converted into frequency hopping sequences having $2^k$ symbols with an even occurrence frequency.

FIG. 2 shows an internal construction of the non-binary sequence converter 200 of FIG. 1, illustrating that a binary sequence is mapped into a non-binary sequence when the number of frequency hopping slots is an exponent of 2.

With reference to FIG. 2, an exclusive-OR operator 230 exclusive-ORs outputs of a shift register 210 and corresponding outputs of an offset data storing unit 220 to generate a non-binary sequence $(Y_1, Y_2, \ldots, Y_v)$. A set of different sequences generated according to values stored in the offset data storing unit 220 can be used as a sequence set for a FH-CDMA.

However, when the conventional frequency hopping sequence generator is applied to the multi-group FH-FDMA communication system, the number of the frequency hopping sequence generator as shown in FIG. 1 is required as many as groups, resulting in hardware complexity of the communication system. Also, since the number of keys is required as many as groups, the keys should be managed as many as the groups, resulting in degraded facilitation of key management.

In addition, problems relating to the synchronization and orthogonality (chip non-collision) or independence between frequency hopping sequence generators should be solved.

SUMMARY OF THE INVENTION

Therefore, an object of the present invention is to provide a frequency hopping sequence generator using a single binary sequence generator on the basis of a band splitting concept that an entire hopping band is divided as many as groups.

The key idea of the present invention is first to decompose the available hopping frequency slots of the hopping bandwidth into disjoint subsets such that the number of slots in each subset is same and the number of subsets is equal to the number of the groups. Then, in order to assure perfect orthogonality between the groups, each hopping group is assigned to one of the subsets in a way that never provides the same subset for different groups, which is called "coarse addressing" mechanism. Conceptually, once a subset for a group is determined through the coarse addressing process, the specific frequency slots within the subset for the users in the group are found out through the "fine addressing" process in a conventional way that a k-tuple vector selected from n-stages of an FSR generating an m-sequence is mapped to a hopping slot as a reference address for the users in the group in FDMA format.

It is noteworthy that the fine addressing process in each subset is performed independently on each other group, which make it impossible to predict the frequency slot of one of the groups only from the information about the hopping slot of any other group at each hopping instance during the period for the higher robustness against hostile interception and jamming.

Moreover in practice, since the two base addresses for the coarse addressing and fine addressing are from the same PN generator because one PN generator is assumed in the developed theorem, the two processes in the proposed design are carried out concurrently, not sequentially. Therefore the hopping sequence generator based on the developed theorems does not suffer latency that might be great concern in constructing FH patterns for a fast frequency hopping system.

And it was proved that those resulting hopping sequences have the favorable characteristics aforementioned.

To achieve these and other advantages, as embodied and broadly described herein, there is provided a frequency hopping sequence generator applied for a multi-group FH-FDMA, including: one binary sequence generator for generating consecutive binary sequence; and plural non-binary sequence converter for mapping the binary sequence into an independent non-binary sequence in each group by using a group ID.

The non-binary sequence converter includes: a shift register block for receiving a binary sequence; a group ID data storing unit for converting the group ID into binary data; a divided band selector for dividing a hopping band as many as groups and allocating the groups to each divided band; and a detailed hopping binary sequence selector for outputting a value for generation of a detailed hopping sequence in each divided band.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
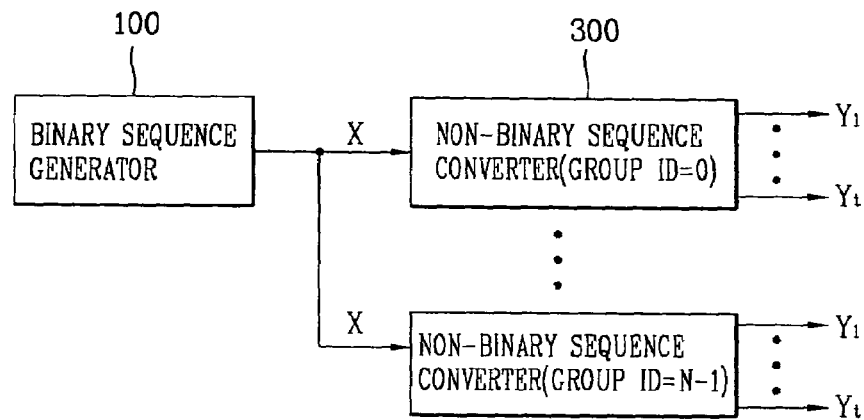
FIG. 3 is an exemplary view showing a frequency hopping sequence generator used for a multi-group FH-FDMA in accordance with the present invention.

FIG. 3 is an exemplary view showing a frequency hopping sequence generator used for a multi-group FH-FDMA in accordance with the present invention.

Figure 1:
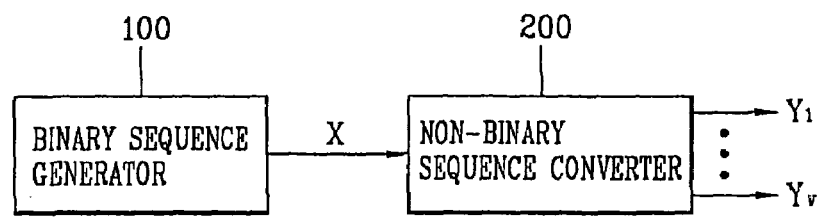
FIG. 1 is a schematic block diagram showing a general frequency hopping sequence generator.
Figure 2:
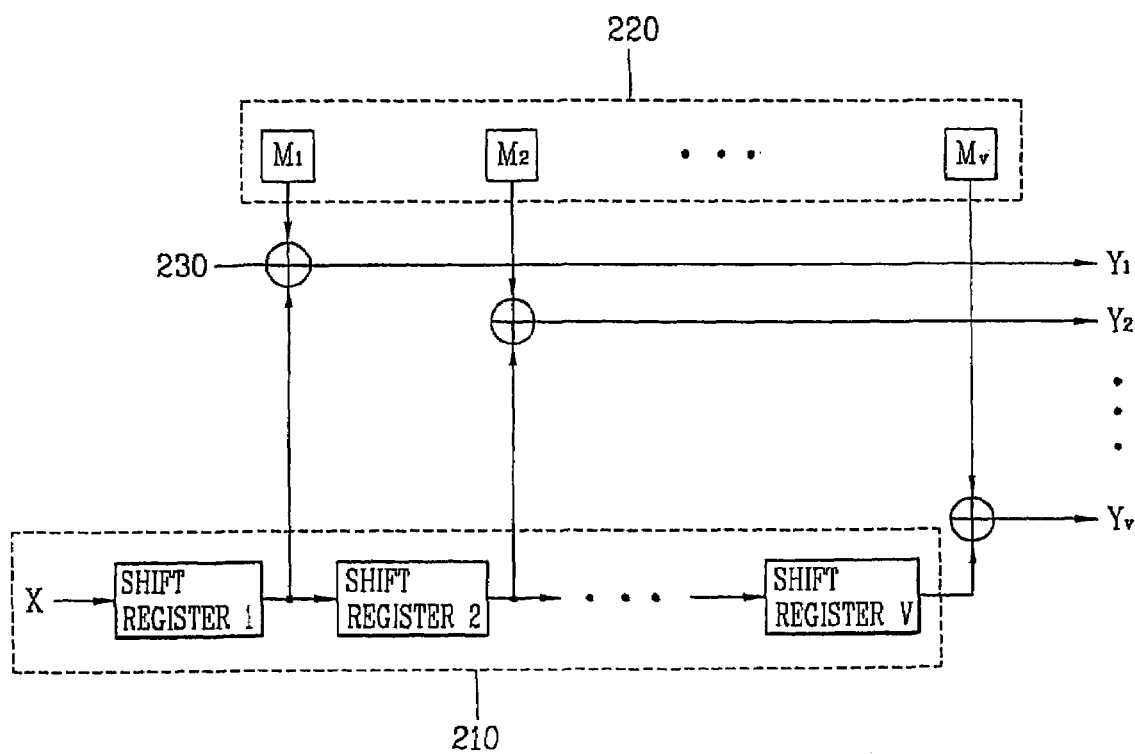
FIG. 2 is a view showing a conventional non-binary sequence converter.

As shown in FIG. 3, in a multi-group FH-FDMA communication system, one binary sequence generator 100 and non-binary sequence converters 300 as many as N groups are used, instead using the frequency hopping sequence generators of FIG. 1 as many as N groups.

Figure 4:
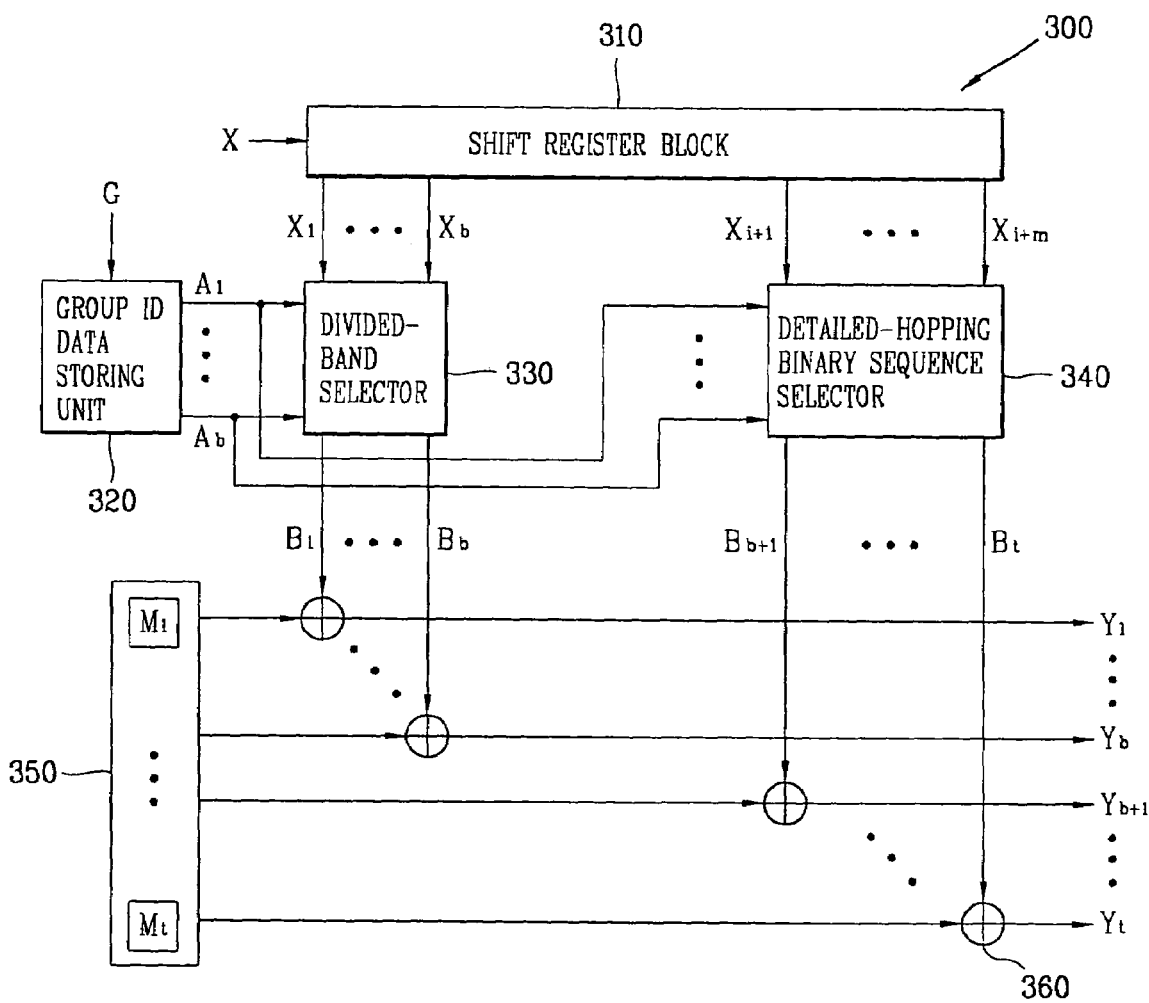
FIG. 4 shows a construction of a non-binary sequence converter in accordance with the present invention.

FIG. 4 shows a construction of a non-binary sequence converter in accordance with the present invention.

The non-binary sequence converter 300 includes a shift register block 310, a group ID data storing unit 320, a divided band selector 330, a detailed hopping binary sequence selector 340, an offset data storing unit 350 and an exclusive-OR operator 360.

In FIG. 4, the desired number (q) of frequency hopping sequences is $2^t$ (t is integer), and if the number (N) of group is $2^b$ (b is integer, ID={0, 1, . . . , N−1}), the shift register block 310 storing consecutive binary sequences received from the binary sequence generator 100 selects b outputs $(X_1 \sim X_b)$ and m(t−b+N−1) outputs $(X_{i+1} \sim X_{i+m})$. The group IID data storing unit 320 outputs $A_1 \sim A_b$ from the group ID (G).

The group ID (G) is determined by the following equation (1);

$$G = \sum_{i=1}^{b} A_i \cdot 2^{i-1} \tag{1}$$

Figure 5:
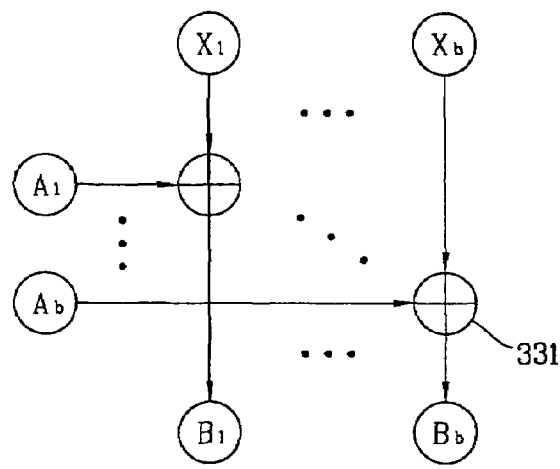
FIG. 5 shows an internal construction of a divided band selector.

Outputs $(X_1 \sim X_b)$ of the shift register block 310 and outputs $(A_1 \sim A_b)$ of the group ID data storing unit 320 are inputted to the divided band selector 330. FIG. 5 shows an internal construction of a divided band selector.

As shown in FIG. 5, in the divided band selector 330, an exclusive-OR operator 331 exclusive-ORs the outputs $(X_1 \sim X_b)$ of the shift register block 310 and outputs $(A_1 \sim A_b)$ of the group ID data storing unit 320 to output divided band select values $(B_1 \sim B_b)$.

The $B_1 \sim B_b$ outputted from the divided band selector 330 is exclusive-ORed with values $(M_1 \sim M_b)$ stored in the offset data storing unit 350 in the exclusive-OR operator 360, and values $(Y_1 \sim Y_b)$ indicating a final divided band are outputted.

As afore-mentioned, in order to generate a frequency hopping sequence allocated to each group, some of the outputs of the binary sequence generator 100 and the group ID are exclusive-ORed in the divided band selector 330. Since the result of the exclusive-OR operation is a 1:1 bijection of mapping outputs $(A_1 \sim A_b)$ into outputs $(B_1 \sim B_b)$ for selection of divided band, an orthogonality between groups, that is, a non-collision, can be guaranteed.

For example, if there are four groups of G=0, 1, 2 and 3, a group ID "0"$(A_2A_1)$=00, group ID "1"$(A_2A_1)$=01, group ID "1$(A_2A_1)$=10, group ID "2"$(A_2A_1)$=11 according to equation (1). Assuming that output value $(X_2X_1)$ of the binary sequence generator 100 is 01, outputs values $(B_1B_2)$ of the divided band selector 330 corresponding to each group are 01, 00, 11 and 10, respectively, so that different values are outputted each group ID (that is, no collision occurs).

Outputs $(X_{i+1} \sim X_{i+m})$ of the shift register block 310 and outputs $(A_1 \sim A_b)$ of the group ID data storing unit 320 are inputted to the detailed hopping binary sequence selector 340.

Figure 6:
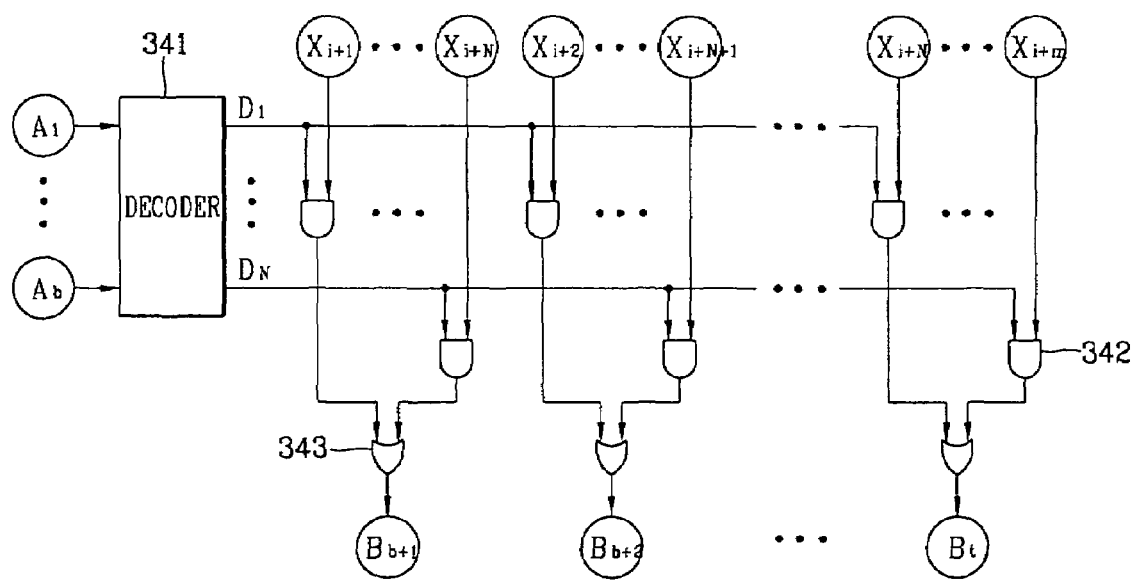
FIG. 6 shows an internal construction of a detailed hopping binary sequence selector.

FIG. 6 shows an internal construction of a detailed hopping binary sequence selector.

In FIG. 6, the binary sequence selector 340 includes a decoder 341, plural AND gates 342 and OR gates 343.

The decoder 341 receives the outputs $(A_1 \sim A_b)$ of the group ID data storing unit 320 and outputs $D_1 \sim D_N$. The outputs $D_1 \sim D_n$ of the decoder 341 and the outputs $(X_{i+1} \sim X_{i+m})$ of the shift register block 310 are logically operated through the AND gate 342 and the OR gate 343. Accordingly, t−b outputs $(B_{b+1} \sim B_t)$ are selected from m outputs $(X_{i+1} \sim X_{i+m})$ of the shift register block 310.

For example, on the assumption that the number (q) of the frequency hopping sequences is 16, that is, t=4 and the number of groups (N)=4, and i=4 for convenience, m=t−b+N−1=4−2+4−1=5. Thus, $B_3$ and $B_4$ are selected for a detailed hopping each group ID in the divided band by using five outputs $(X_5 \sim X_9)$ of the shift register block 310. That is, values selected from five outputs values $(X_5 \sim X_9)$ by the logical operation of the AND gate 342 and the OR gate 343 serving as a select switch are as follows:

If G=0, $A_2A_1$=00 and an output of the decoder 341 is $D_1D_2D_3D_4$=1000, so selected value $(B_3,B_4)=X_5,X_6$, and likewise, If G=1, $A_2A_1$=01 $D_1D_2D_3D_4$=0100, $(B_3,B_4)=X_6,X_7$,
If G=2, $A_2A_1$=10 $D_1D_2D_3D_4$=0010, $(B_3,B_4)=X_7,X_8$,
If G=3, $A_2A_1$=11 $D_1D_2D_3D_4$=0001, $(B_3,B_4)=X_8,X_9$.

Consequently, it is noted that a specific value is selected for generation of the detailed hopping sequence for each group ID.

$B_{b+1} \sim B_1$ outputted from the detailed hopping binary sequence selector 340 are exclusive-ORed with the values $(M_{b+1} \sim M_1)$ stored in the offset data storing unit 350 by the exclusive-OR operator 360, and a detailed hopping sequence $(Y_{b+1} \sim Y_1)$ are outputted in the final divided band.

In the frequency hopping sequence (f), the upper $Y_1 \sim Y_b$ indicates the N divided band, and the lower $Y_{b+1} \sim Y_t$ indicates the detailed hopping sequences in the divided band. The frequency hopping sequence (f) is determined by the below equation (2):

$$f = \sum_{i=1}^{t} Y_i 2^{i-1} \quad (2)$$

As described above, the frequency hopping sequence generator of the present invention has many advantages.

That is, for example, because the frequency hopping sequence generator uses the single binary sequence generator, a hardware size is reduced, and because only one key and group ID information are managed, it is easy to manage the key.

In addition, time synchronization between groups is solved and orthogonality is guaranteed without an algorithm for preventing collision between groups in hopping.

Moreover, because a specific value is selected for the detailed hopping and accordingly a relative hopping distance between groups has randomness, an ability of military operation is improved in an electronic warfare.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A frequency hopping sequence generator applied to a multi-group frequency hopping frequency division multiple access (FH-FDMA) communication system, comprising:
   one binary sequence generator for generating consecutive binary sequences; and
   a plurality of non-binary sequence converters for mapping a binary sequence into an independent non-binary sequence for each group of the multiple groups by using a group identifier (ID) assigned to each group, each of the plurality of non-binary sequence converters having a shift register block for receiving the binary sequence and a group ID data storing unit for converting the group ID into binary data, a divided band selector for dividing a hopping band as many as groups and allocating the groups to each of the divided bands; and a detailed hopping binary sequence selector for outputting a value for generation of a detailed hopping sequence in each of the divided bands.

2. The generator of claim 1, wherein the divided band selector comprises: an exclusive-OR operator for exclusive-ORing some binary sequences outputted from the shift register block and binary data of the group ID outputted from the group ID data storing unit, and dividing the hopping band.

3. The generator of claim 1, wherein the detailed hopping binary sequence selector comprises:
   a decoder for decoding the binary data of the group ID; and
   a calculating unit for performing a logical operation on an output of the decoder and some of the binary sequences outputted from the shift register block.

* * * * *